United States Patent Office 2,723,195
Patented Nov. 8, 1955

2,723,195

PAPER PRODUCTS AND PROCESSES

Edward S. Blake, Lexington, Mass., assignor to Monsanto Chemical Company, St. Louis, Mo., a corporation of Delaware No Drawing. Application July 29, 1950,
Serial No. 176,783

11 Claims. (Cl. 92—3)

The present invention relates to novel derivatives of copolymers of polymerizable vinyl compounds and dicarboxylic anhydrides having ethylenic unsaturation, and it also relates to processes of preparing such derivatives. This invention also relates to the preparation of paper of high wet strength which is particularly resistant to citric acid.

It has been proposed heretofore to prepare various ammonium and alkyl amine salts of styrene-maleic acid copolymers. Such salts are stated to be water-soluble and to be useful in the preparation of printing pastes and for dressing textiles. It has also been proposed to prepare water-soluble mono-, di-, and triethanolamine salts of styrene-maleic acid copolymers for similar purposes. All of these prior products have the disadvantage of being unstable in acid solutions and break down to liberate the styrene-maleic acid copolymer which is insoluble in water or in an acidic water solution. Diethanolamine and triethanolamine salts have the added disadvantage of forming cross-linked polymeric products which are water-insoluble.

It is one object of the present invention to provide novel esters of copolymers of polymerizable vinyl compounds and dicarboxylic anhydrides having ethylenic unsaturation.

A further object of this invention is to provide novel water-soluble esters of styrene-maleic anhydride copolymers.

A further object of this invention is to provide a process for preparing novel esters of copolymers of a polymerizable vinyl compound and dicarboxylic anhydrides having ethylenic unsaturation.

A further object of this invention is to provide methods for preparing paper of improved wet strength, and to provide novel paper materials.

Still further objects and advantages of this invention will appear in the following description and the appended claims.

The processes of this invention are carried out, in general, by reacting a heterocyclic or alkyl tertiary amine containing from 3 to 11 carbon atoms and having only one primary or secondary hydroxyl group and no other active substituent groups, with a copolymer of a polymerizable vinyl compound having a single $>C=CH_2$ group and a dicarboxylic anhydride having ethylenic unsaturation and from 4 to 8 carbon atoms. By "primary or secondary hydroxyl group" as used herein, is meant a hydroxyl group attached to a carbon atom having at least one hydrogen atom. Tertiary hydroxyl groups are not included in the scope of this invention. The reaction between the mono-hydroxy tertiary amine and the copolymer is carried out in an inert, substantially anhydrous liquid which may be a solvent or non-solvent for the copolymer, but is at least a solvent for the mono-hydroxy tertiary amine. The mono-hydroxy tertiary amine and the copolymer are preferably heated in the inert liquid to increase the rate of reaction but heating is not essential, particularly if the reaction is carried out in an inert liquid which is a solvent for both reactants. After the reaction is carried out to the desired extent the product is isolated from the liquid.

The copolymers employed in the processes of this invention may be prepared from a variety of vinyl compounds and dicarboxylic anhydrides and in a variety of ways. As examples of vinyl compounds having a single $>C=CH_2$ group and which are suitable for use in preparing such copolymers may be mentioned styrene, p-methyl styrene, p-chloro styrene, vinyl esters such as vinyl acetate, and the like, vinyl halides such as vinyl chloride and the like, vinyl ethers such as vinyl ethyl ether and the like. In general, the vinyl compounds described in the Voss Patent No. 2,047,398 are suitable for preparing the copolymers employed in the processes of this invention. A particularly preferred class of vinyl compounds are those having the structural formula $R-CH=CH_2$, where R is a phenyl or a methyl or chloro substituted phenyl radical. As examples of vinyl compounds having such a structural formula may be mentioned styrene, p-methyl styrene and p-chloro styrene. Styrene is the preferred vinyl compound because of its availability and low cost, and because it copolymerizes easily with dicarboxylic anhydrides such as maleic anhydride to form low color copolymers which are soluble in a relatively large variety of organic liquids.

Vinyl compounds such as acrylonitrile, acrylic acid or alkyl acrylates and vinylidene compounds such as methacrylic acid or alkyl methacrylates may be used to replace a part of the above described vinyl compounds and to modify the properties of the copolymers prepared from such vinyl compounds.

As examples of dicarboxylic anhydrides which are useful in preparing the copolymers employed in this invention may be mentioned maleic anhydride, chloromaleic anhydride, citraconic anhydride, itaconic anhydride and the like. Such dicarboxylic anhydrides may contain substituent groups such as halides, alkyl groups and the like and at least 4 but not more than 8 carbon atoms. However, they should not contain reactive substituent groups such as sulfonic acid, nitrile or other reactive groups. Small amounts of maleic acid, fumaric acid, citraconic acid, itaconic acid and alkyl half esters of such acids, or acrylic or methacrylic acid may be used together with the anhydrides. However, such compounds should not be present in amounts exceeding 20% of the weight of the anhydrides. Of course, mixtures of the anhydrides may be used. Maleic anhydride per se is preferred because of its low cost and ready availability, and also because it gives with styrene a hard, low color copolymer having many desirable properties.

The copolymers employed in this invention are suitably prepared by mass polymerizing the vinyl compound and the dicarboxylic anhydride. In the mass polymerization process, the monomeric vinyl compound and dicarboxylic anhydride are generally heated to temperatures within the range of 40 to 80° C. and maintained at such temperatures until the major portion of the monomers have reacted, after which the temperature of the mass is raised to 100 to 175° C. to complete the polymerization of the remaining monomers. The mass polymerization process is preferably carried out by polymerizing the monomers in the presence of a small amount of a polymerization catalyst, particularly a peroxide catalyst such as benzoyl peroxide. The mass is substantially free of solvents or diluents for the monomers. Mass polymerization processes are illustrated in the Voss patent mentioned above.

Another suitable method for preparing the copolymers employed in the processes of this invention is the so-called solvent-non-solvent process which involves heating a solution of the vinyl compound and the dicarboxylic anhydride in a hydrocarbon liquid which is a solvent for the monomers but a non-solvent for the copolymer formed by the polymerization of the monomers. Benzene and xylene have been successfully used as the hydrocarbon liquid. The process is preferably carried out in the presence of a small amount of a polymerization catalyst, particularly a peroxide catalyst such as benzoyl peroxide. This process for producing the copolymer is preferred since the copolymer can be reacted in the hydrocarbon liquid with the mono-hydroxy tertiary amine without isolating the copolymer.

For best results the copolymers should be prepared by using from 1 to 1.5 molecular proportions of the vinyl compound for each molecular proportion of the dicarboxylic anhydride. In most instances, the copolymer will contain the vinyl compound and the dicarboxylic anhydride in equimolecular proportions irrespective of the proportions of the reactants initially employed, especially when the copolymer is prepared from styrene and maleic anhydride.

In preparing the novel esters of this invention the copolymers are contacted with the mono-hydroxy tertiary amines in an inert, substantially anhydrous organic liquid. The liquid may be a solvent or a non-solvent for the copolymer. If a non-solvent liquid is used, it is preferred to heat the reactants. Under these conditions the reaction is preferably carried out at the reflux temperature of the liquid for ease of operation. In general, temperatures between about 20° C. and 150° C. are suitable.

The proportions of the mono-hydroxy tertiary amine to the copolymer may be varied appreciably depending upon the properties desired in the reaction product. In general, it is possible to employ from about 0.25 to 1 mol of the amine for each anhydride or dicarboxyl group in the copolymer. This may also be expressed as 0.25 to 1 mol of amine for each vinyl-dicarboxylic unit in the copolymer. It is possible to obtain water-soluble products by using substantially 1 molecular proportion of the amine for each anhydride group in the copolymer. Such products are water-soluble in alkaline or acid aqueous solutions within a pH range between about 2 and 11. By using smaller amounts of the amine, for example, between 0.5 and 0.75 molecular proportions of the amine for each molecular proportion of the anhydride in the copolymer, it is possible to obtain products which are soluble in alkaline aqueous solutions, but which are relatively insoluble in acidic aqueous solutions. Excess amine has no influence on the composition of the product or its solubility in water, and is only desirable in some instances to bring about a more complete reaction between the amine and the copolymer.

The reaction time may be varied considerably depending upon the proportions of amine to copolymer, the temperature used and the solubility of the copolymer in the organic liquid. Generally, the time required will vary between about 15 minutes and 15 hours depending upon the foregoing factors.

The reaction between the amine and the copolymer involves an opening of the anhydride ring of the copolymer with the formation of an ester according to the following equation:

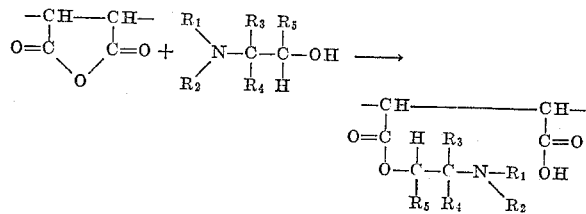

In the above formula of the amine, $R_1$ and $R_2$ represent alkyl residues containing from 1 to 4 carbon atoms, or alkoxy alkyl residues containing from 2 to 6 carbons or a carbocyclic ring or heterocyclic ring containing from 4 to 5 carbon atoms, and $R_3$, $R_4$ and $R_5$ represent similar alkyl or alkoxy alkyl residues or hydrogen. The carboxylic anhydride grouping is a recurring grouping in the vinyl compound-dicarboxylic anhydride copolymer chain. It is believed that the un-esterified carboxyl group reacts with the tertiary nitrogen atom of the ester chain to form an internal salt of the copolymer. This has not been completely verified but is evidenced by the solubility of the product in water under acid or alkaline conditions and the insolubility of the product in solvents for the copolymer. The ester-salt of the copolymer is believed to contain the following grouping:

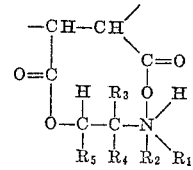

As examples of mono-hydroxy heterocyclic tertiary amines which are useful in preparing the products of this invention may be mentioned 2-ethanol pyridine, N-(β-hydroxy ethyl) piperidine and 2-propanol pyridine. As examples of mono-hydroxy tertiary alkyl amines which are used in the processes of this invention may be mentioned dimethyl amino methanol, dimethyl amino ethanol, diethyl amino propanol, dimethyl amino propanol, di-n-butyl amino propanol, diethyl amino ethanol, diethyl amino butanol and the like. Other mono-hydroxy tertiary amines such as dimethyl amino cyclohexanol are useful. The mono-hydroxy tertiary alkyl amines having from 4 to 8 carbon atoms are preferred since they react readily with the copolymer to form products which are soluble in water or acidic water solutions. Of these tertiary amines, diethyl amino ethanol and dimethyl amino ethanol are preferred.

As indicated previously the reaction is preferably carried out in an inert substantially anhydrous liquid which is a non-solvent for the copolymer and a solvent for the mono-hydroxy tertiary amine, since it is possible to prepare the copolymer in an organic hydrocarbon liquid which is a solvent for the monomers but is a non-solvent for the copolymer without isolating the copolymer. As examples of such liquids which are useful in the processes of this invention may be mentioned benzene, toluene, xylene or similar aromatic hydrocarbons, mixtures of such aromatic hydrocarbons with aliphatic hydrocarbons such as heptane, hexane, octane and the like or chlorinated aliphatic or aromatic hydrocarbons such as ethylene dichloride or chlorobenzene. It is not necessary when using such liquids to prepare the copolymer in the liquid prior to the reaction with the mono-hydroxy tertiary amine since it is possible to prepare the copolymer by mass polymerization processes, grind the copolymer until it is in a very finely divided condition and then suspend the copolymer in the liquid.

As indicated previously, it is possible to carry out the reaction between the mono-hydroxy tertiary amine and the copolymer in an inert organic liquid which is a solvent for both reactants. A wide variety of organic liquids are useful for this purpose. The ketones having from 3 to 5 carbon atoms, including acetone, diethyl ketone and methyl ethyl ketone, are preferred.

The water-soluble reaction products of this invention are substantive to negatively charged solids such as cellulosic materials as, for example, paper and cotton.

The water-soluble reaction products of the copolymers and the mono-hydroxy tertiary amines described herein are especially suitable for the treatment of paper pulp furnishes for the preparation of paper sheet materials of high wet strength. The reaction product is preferably added to the paper pulp furnish in amounts sufficient to provide from about 0.1 to 5% of the reaction product on the air dry weight of the paper pulp fibers. The pH of the furnish is then preferably adjusted to a pH between about 3 and 5 with an acid, preferably a mineral acid such as hydrochloric acid, or with normal or basic aluminum sulfate. Best results are obtained with the various aluminum sulfates used in the papermaking art and therefore the pH is preferably adjusted with these materials. The paper pulp furnish is next formed into a sheet in the conventional way and is dried and heated to a temperature between about 90° and 130° C. to develop the wet strength of the paper. A heating period of 30 minutes to 6 hours is generally suitable for this purpose.

The paper products prepared in the manner described above retain their wet strength when immersed in water or in water solutions of citric acid for long periods of time. The paper products, because of their resistance to loss of strength when in contact with citric acid, are especially suitable for wrapping or packaging citrus fruits such as oranges, lemons, grapefruit and the like.

A further understanding of the present invention will be obtained from the following specific examples which are intended to illustrate but not to limit the scope of the invention, parts and percentages being by weight unless otherwise specified.

*Example I*

Fifty parts of minus 60 mesh styrene-maleic anhydride copolymer (containing approximately 48% combined maleic anhydride and 52% combined styrene) were suspended in 150 parts of benzene in a vessel equipped with a reflux condenser and a stirrer. The suspension was well agitated and the contents of the vessel were heated to the refluxing temperature (about 82° C.) on a steam bath and maintained at that temperature. Thirty parts of diethylamino ethanol were added to the suspension and the resulting mixture was heated for 10 hours with stirring. The suspension was then cooled to about 25° C. and then filtered to recover the reaction product. The solid product was washed with benzene and then dried at a temperature of about 30° C. The yield of the reaction product of diethyl amino ethanol and styrene-maleic copolymer was substantially quantitative.

The diethyl amino ethanol ester of the styrene-maleic anhydride copolymer prepared in accordance with the above procedure is soluble in water, and dilute water solutions of hydrochloric acid at a pH as low as 2.0. The reaction product is also soluble in dilute alkaline water solutions. The product is substantive in water solutions to negatively charged solids such as cotton or paper.

A similar product was prepared by reacting the styrene-maleic anhydride copolymer and the diethyl amino ethanol for a period of 1 hour instead of 10 hours as described above.

*Example II*

Twenty-five parts of a styrene maleic anhydride copolymer (containing approximately 48% combined maleic anhydride and 52% combined styrene) were dissolved in 500 parts of methyl ethyl ketone. Fifteen parts of diethyl amino ethanol were added to the solution of the copolymer at a temperature of about 25° C. The solution was agitated and maintained at this temperature for a period of 30 minutes. The reaction product separated from solution as it was formed and, after the 30 minute reaction period, was separated by filtration. The yield of the reaction product of diethyl amino ethanol and styrene-maleic anhydride copolymer was substantially quantitative.

The diethyl amino ethanol ester of the styrene-maleic anhydride copolymer had substantially the same properties as the product prepared in accordance with the procedure of Example I.

*Example III*

Bleached Gatineau (Canadian) sulfite pulp was refined to 350 cc. Canadian Standard Freeness and then divided into 4 separate portions. One portion of the pulp was treated with a water solution of the diethyl amino ethanol ester of styrene-maleic anhydride copolymer (prepared as described in Example I) and containing a small amount of ammonia. The solution was supplied in an amount sufficient to provide 1% of the ester on the weight of the air-dry pulp fibers. Two of the remaining pulp portions were treated in the same manner except that the solution was supplied in amounts sufficient to provide 2% and 4%, respectively, of the ester on the weight of the air-dry pulp fibers. Each of the treated pulp portions was divided into 2 separate portions. One portion was treated with 3%, on the weight of the pulp, of normal aluminum sulfate, and the other portion was adjusted to a pH of 4.2 with hydrochloric acid. The treated pulp portions were formed into hand sheets on a Noble and Wood Laboratory sheetmaking machine, and the sheets were heated for 4 hours at 105° C. to develop the full wet strength of the sheet.

The sheets were cut into strips 14 millimeters wide, and then soaked for 16 hours in distilled water at a temperature of 73° F. The sheets were then tested for wet tensile strength according to TAPPI (Technical Association of the Paper and Pulp Industry) Standard T–456, the results being calculated as pounds of tensile strength per inch width. Additional strips of the treated paper were soaked in a 1.5% water solution of citric acid for 16 hours and then tested for wet tensile strength in the same manner.

The following table gives the results obtained.

| Percent of Ester of Styrene-Maleic Anhydride Copolymer Applied | Wet Tensile Strength (Lbs./inch) | | | |
|---|---|---|---|---|
| | Water Soak | | Citric Acid Soak | |
| | 3% Normal Aluminum Sulfate | Pulp Adjusted to pH 4.2 with HCl | 3% Normal Aluminum Sulfate | Pulp Adjusted to pH 4.2 with HCl |
| 0 | 1.68 | 1.35 | 1.43 | 1.50 |
| 1 | 4.78 | 5.09 | 5.00 | 5.82 |
| 2 | 5.42 | 3.66 | 5.90 | 4.37 |
| 4 | 5.81 | 3.99 | 6.13 | 5.03 |

The above wet-tensile strengths indicate that a higher wet tensile strength is obtained with normal aluminum sulfate than with HCl. Moreover, the wet tensile strength after the citric acid soak is higher than the wet tensile strength after a water soak. Paper treated with the usual nitrogen-containing thermosetting or aminoplast resins show a loss of 50% in wet strength when soaked in citric acid under the same conditions.

*Example IV*

A reaction product was first prepared as described in Example I, except that 0.25 molecular proportion of diethyl amino ethanol was used for each anhydride group in the styrene-maleic anhydride copolymer. The reaction product was dissolved in a dilute water solution of ammonia and used to treat a sulfite pulp furnish using the procedure described in Example III, and supplying 1%, 2% and 4%, respectively, of the reaction product on the weight of the dry pulp. The wet tensile strength of the paper formed from the pulp furnish, after immersion for 16 hours in water at a temperature of 73° F., is given below:

| Percent of Ester of Styrene-Maleic Anhydride Copolymer Applied | Wet Tensile Strength (Lbs./inch) | |
|---|---|---|
| | 3% Normal Aluminum Sulfate | Pulp Adjusted to pH of 4.2 with HCl |
| 1 | 2.99 | 2.45 |
| 2 | 3.16 | 2.72 |
| 4 | 2.39 | 2.62 |

Example V

A reaction product was first prepared as described in Example I, except that 0.5 molecular proportion of diethyl amino ethanol was used for each anhydride group in the styrene-maleic anhydride copolymer. The reaction product was dissolved in a dilute water solution of ammonia and used to treat a sulfite pulp furnish using the same procedure described in Example III, and supplying 1, 2 and 4%, respectively, of the reaction product on the weight of the dry pulp. The wet tensile strength of the paper formed from the pulp furnish, after immersion in water at 73° F., is given below:

| Percent of Ester of Styrene-Maleic Anhydride Copolymer Applied | Wet Tensile Strength (Lbs./inch) | |
|---|---|---|
| | 3% Normal Aluminum Sulfate | Pulp Adjusted to pH of 4.2 with HCl |
| 1 | 3.85 | 2.86 |
| 2 | 4.22 | 2.88 |
| 4 | 4.36 | 2.78 |

Example VI

Dimethyl amino propanol, diethyl amino propanol, di-n-butyl amino propanol, 2-ethanol pyridine and 2-propanol pyridine esters of styrene-maleic anhydride copolymer were prepared according to the procedures described in Examples I and II using molecular quantities of such tertiary amines equivalent to the molecular quantities of diethyl amino ethanol employed. The resulting reaction products were similar to those described in Examples I and II.

Various modifications and changes may be made in the processes and products of this invention as will be apparent to those skilled in the art to which it appertains without departing from the spirit or intent of the invention. It is accordingly intended that the scope of this invention shall only be limited by the scope of the appended claims.

What is claimed is:

1. A process of preparing paper of high wet strength which comprises treating a paper pulp furnish with a reaction product of a tertiary amine containing from 3 to 11 carbon atoms and having only one hydroxyl group which is attached to a carbon atom having at least one hydrogen atom, and a copolymer of a polymerizable vinyl compound containing a single $>C=CH_2$ group and a dicarboxylic anhydride having ethylenic unsaturation and containing from 4 to 8 carbon atoms; adjusting the pH of the furnish between 3 and 5; forming the furnish into a paper sheet and thereafter heating the paper sheet to develop the wet strength of the paper.

2. A process of preparing paper of high wet strength which comprises treating a paper pulp furnish with from 0.1 to 5% by weight on the weight of the paper pulp fibers of a monohydroxy tertiary alkyl amine ester of a copolymer of maleic anhydride and a vinyl compound having the structural formula: $R-CH=CH_2$, where R is selected from the group consisting of phenyl, methyl substituted phenyl and chloro substituted phenyl radicals, said amine containing from 4 to 8 carbon atoms, said maleic anhydride and vinyl compound being copolymerized in a mol ratio of 1:1 to 1:1.5; adjusting the pH of the furnish between 3 and 5; forming the furnish into a paper sheet and thereafter heating the paper sheet at temperatures between 90 and 130° C. to develop the wet strength of the paper.

3. A process for producing paper of high wet strength which comprises treating a paper pulp furnish with from 0.1 to 5% by weight on the weight of the paper pulp fibers of a diethyl amino ethanol ester of a styrene-maleic anhydride copolymer containing styrene and maleic anhydride combined in substantially equimolecular proportions, said ester containing from 0.25 to 1 mol of the amino compound for each anhydride group in the copolymer; adjusting the pH of the furnish between 3 and 5; forming the furnish into a paper sheet and thereafter heating the paper sheet to a temperature of 90 to 130° C. to develop the wet strength of the paper.

4. A paper product comprising a paper sheet containing the reaction product of a tertiary amine containing from 3 to 11 carbon atoms and having only one hydroxyl group which is attached to a carbon atom having at least one hydrogen atom, and a copolymer of a polymerizable vinyl compound having a single $>C=CH_2$ group and a dicarboxylic anhydride having ethylenic unsaturation and containing from 4 to 8 carbon atoms, said reaction product being present in amounts sufficient to impart wet strength to the paper sheet.

5. A process for producing paper of high wet strength which comprises treating a paper pulp furnish with from 0.1 to 5% by weight on the weight of the paper pulp fibers of a dimethyl amino propanol ester of a styrene-maleic anhydride copolymer containing styrene and maleic anhydride combined in substantially equimolecular proportions, said ester containing from 0.25 to 1 mol of the amino compound for each anhydride group in the copolymer; adjusting the pH of the furnish between 3 and 5; forming the furnish into a paper sheet and thereafter heating the paper sheet to a temperature of 90 to 130° C. to develop the wet strength of the paper.

6. A process for producing paper of high wet strength which comprises treating a paper pulp furnish with from 0.1 to 5% by weight on the weight of the paper pulp fibers of a dimethyl amino ethanol ester of a styrene-maleic anhydride copolymer containing styrene and maleic anhydride combined in substantially equimolecular proportions, said ester containing from 0.25 to 1 mol of the amino compound for each anhydride group in the copolymer; adjusting the pH of the furnish between 3 and 5; forming the furnish into a paper sheet and thereafter heating the paper sheet to a temperature of 90 to 130° C. to develop the wet strength of the paper.

7. A paper product comprising a paper sheet containing the reaction product of a tertiary alkyl amine containing from 4 to 8 carbon atoms and having only one hydroxyl group which is attached to a carbon atom having at least one hydrogen atom, and a copolymer of maleic anhydride and a vinyl compound having the structural formula $R-CH=CH_2$, where R is selected from the group consisting of phenyl, methyl substituted phenyl and chloro substituted phenyl groups, said maleic anhydride and vinyl compound being copolymerized in a mol ratio of 1:1 to 1:1.5, said reaction product being present in amounts sufficient to impart wet strength to the paper sheet.

8. A paper product comprising a paper sheet containing a hydroxy tertiary alkyl amine ester of a copolymer of styrene and maleic anhydride containing styrene and maleic anhydride combined in substantially equimolecular proportions, said amine containing from 4 to 8 carbons and only one hydroxyl group which is attached to a carbon atom having at least one hydrogen atom, said ester containing from 0.25 to 1 mol of amino compound for each anhydride group in said copolymer, said ester being present in amounts between 0.1 and 5% by weight on the weight of the paper fibers in said sheet.

9. A paper product as defined in claim 8, but further characterized in that the amine is diethyl amino ethanol.

10. A paper product as defined in claim 8, but further characterized in that the amine is dimethyl amino propanol.

11. A paper product as defined in claim 8, but further characterized in that the amine is dimethyl amino ethanol.

(References on following page)

References Cited in the file of this patent

UNITED STATES PATENTS

| | | |
|---|---|---|
| 2,047,398 | Voss | July 14, 1936 |
| 2,230,240 | Gerhart | Feb. 4, 1941 |
| 2,246,264 | Pinkernelle | June 17, 1941 |
| 2,279,882 | D'Alelio | Apr. 14, 1942 |
| 2,325,302 | Britt | July 27, 1943 |
| 2,338,602 | Schur | Jan. 4, 1944 |
| 2,537,020 | Barrett | Jan. 9, 1951 |
| 2,548,513 | Boughton | Apr. 10, 1951 |
| 2,628,918 | Wilson et al. | Feb. 17, 1953 |

OTHER REFERENCES

Collins, Paper Industry and Paper World, June 1943, pages 263–269.

Conant and Blatt, The Chemistry of Organic Compounds, 3rd ed., page 25, published 1947 by Macmillan Company.